US010120441B2

(12) United States Patent
Imoto et al.

(10) Patent No.: US 10,120,441 B2
(45) Date of Patent: Nov. 6, 2018

(54) CONTROLLING DISPLAY CONTENT BASED ON A LINE OF SIGHT OF A USER

(71) Applicant: Sony Corporation, Tokyo (JP)

(72) Inventors: Maki Imoto, Tokyo (JP); Takuro Noda, Tokyo (JP); Ryouhei Yasuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 14/917,244

(22) PCT Filed: Jun. 30, 2014

(86) PCT No.: PCT/JP2014/067433
§ 371 (c)(1),
(2) Date: Mar. 7, 2016

(87) PCT Pub. No.: WO2015/037310
PCT Pub. Date: Mar. 19, 2015

(65) Prior Publication Data
US 2016/0195926 A1    Jul. 7, 2016

(30) Foreign Application Priority Data
Sep. 13, 2013    (JP) .................................. 2013-190715

(51) Int. Cl.
*G06K 9/00* (2006.01)
*G06F 3/01* (2006.01)
G06F 3/03 (2006.01)
*G06F 3/16* (2006.01)

(52) U.S. Cl.
CPC .............. *G06F 3/013* (2013.01); *G06F 3/012* (2013.01); *G06F 3/017* (2013.01); *G06F 3/0304* (2013.01); *G06F 3/167* (2013.01)

(58) Field of Classification Search
CPC .......... G06F 3/012; G06F 3/013; G06F 3/017; G06F 3/0304; G06F 3/167
See application file for complete search history.

(56) References Cited

U.S. PATENT DOCUMENTS

2006/0281969 A1* 12/2006 Wang ................. G06K 9/00604
600/103
2009/0074304 A1* 3/2009 Momosaki ........ G06F 17/30787
382/224
(Continued)

FOREIGN PATENT DOCUMENTS

EP         2850504 A2      3/2015
JP       11-327753 A      11/1999
(Continued)

OTHER PUBLICATIONS

Office Action for EP Patent Application No. 14843497.0, dated Aug. 6, 2018, 07 pages.

*Primary Examiner* — Bhavesh Mehta
*Assistant Examiner* — Ian Lemieux
(74) *Attorney, Agent, or Firm* — Chip Law Group

(57) ABSTRACT

There is provided an information processing apparatus including an image acquisition unit configured to acquire a captured image of users, a determination unit configured to determine an operator from among the users included in the acquired captured image, and a processing unit configured to conduct a process based on information about user line of sight corresponding to the determined operator.

19 Claims, 6 Drawing Sheets

(56) References Cited

U.S. PATENT DOCUMENTS

| | | | |
|---|---|---|---|
| 2009/0315869 A1* | 12/2009 | Sugihara | G06F 1/1605 |
| | | | 345/204 |
| 2010/0205667 A1* | 8/2010 | Anderson | G06F 3/013 |
| | | | 726/19 |
| 2011/0032274 A1* | 2/2011 | Miyata | G06F 3/011 |
| | | | 345/660 |
| 2012/0106792 A1* | 5/2012 | Kang | G06K 9/00228 |
| | | | 382/103 |
| 2013/0243270 A1* | 9/2013 | Kamhi | G06K 9/00281 |
| | | | 382/118 |
| 2013/0307771 A1* | 11/2013 | Parker | G06F 3/013 |
| | | | 345/158 |
| 2014/0157129 A1* | 6/2014 | Dinshaw | G06F 3/017 |
| | | | 715/728 |
| 2015/0030214 A1* | 1/2015 | Fujiwara | G06F 17/30247 |
| | | | 382/118 |
| 2015/0116206 A1* | 4/2015 | Irie | G06F 3/012 |
| | | | 345/156 |
| 2016/0246366 A1* | 8/2016 | Huang | G06F 3/013 |

FOREIGN PATENT DOCUMENTS

| | | |
|---|---|---|
| JP | 2010-231355 A | 10/2010 |
| JP | 2010-238145 A | 10/2010 |
| JP | 2014-086085 A | 5/2014 |

* cited by examiner

FIG. 1
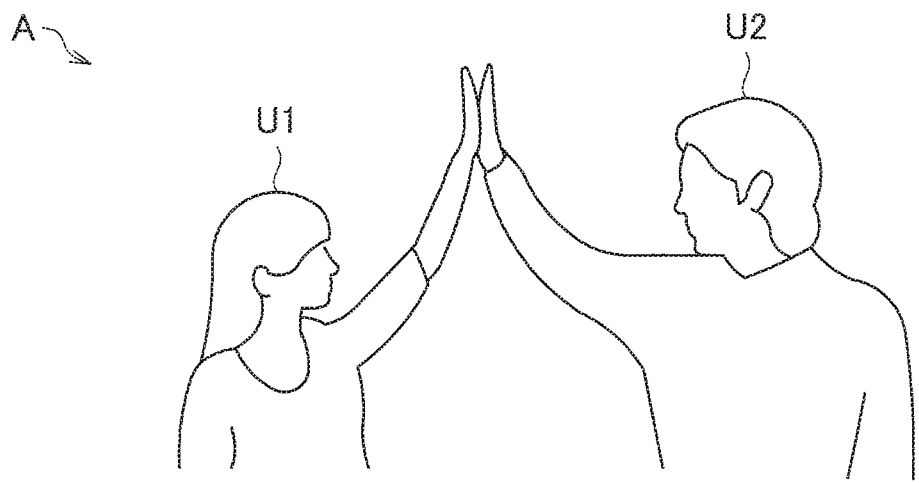
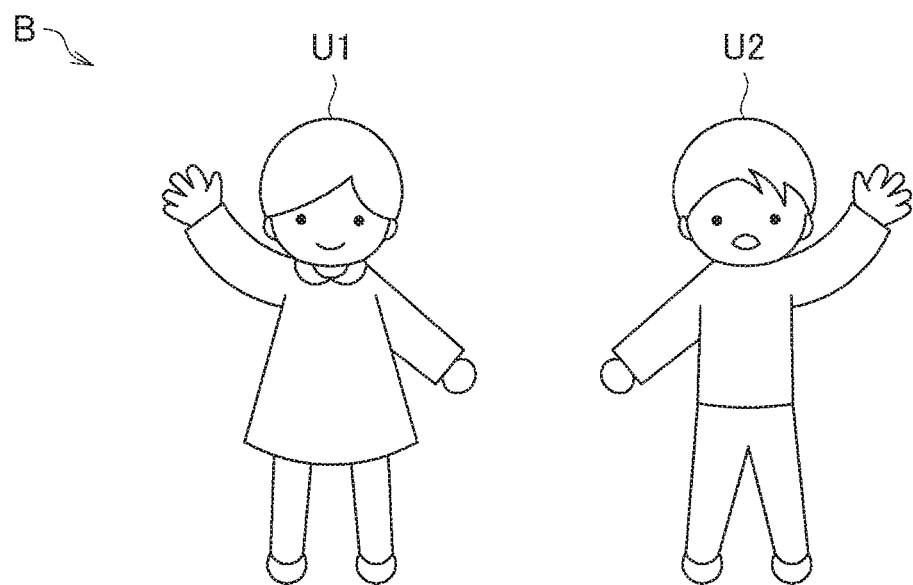

CONTROLLING DISPLAY CONTENT BASED ON A LINE OF SIGHT OF A USER

TECHNICAL FIELD

The present disclosure relates to an information processing apparatus, an information processing method, and a program.

BACKGROUND ART

In recent years, user interfaces allowing a user to operate through the line of sight by using line-of-sight detection technology such as an eye tracking technology are emerging. For example, the technology described in PTL 1 below can be cited as a technology concerning the user interface allowing the user to operate through the line of sight.

CITATION LIST

Patent Literature

Patent Literature 1: JP 2009-64395A

SUMMARY OF INVENTION

Technical Problem

For example, when an operation is performed through a user's line of sight, an apparatus that conducts a process based on a user's line of sight needs to conduct the process after determining which user's line of sight to use as the basis for conducting the process, or in other words, determining the operator who performs an operation through line of sight (hereinafter simply called the "operator" in some cases). However, a method of determining the operator in an apparatus like the above has not been established.

The present disclosure proposes a new and improved information processing and information processing method capable of determining an operator who performs an operation through line of sight, and conducting a process based on the line of sight of the determined operator.

Solution to Problem

According to the present disclosure, there is provided an information processing apparatus including: an image acquisition unit configured to acquire a captured image of users; a determination unit configured to determine an operator from among the users included in the acquired captured image; and a processing unit configured to conduct a process based on information about user line of sight corresponding to the determined operator.

According to the present disclosure, there is provided an information processing method executed by an information processing apparatus, the information processing method including: a step of acquiring a captured image of users; a step of determining an operator from among the users included in the acquired captured image; and a step of conducting a process based on information about user line of sight corresponding to the determined operator.

Advantageous Effects of Invention

According to the present disclosure, it is possible to determine an operator who performs an operation through line of sight, and conduct a process based on the line of sight of the determined operator.

The above effect is not necessarily restrictive and together with the above effect or instead of the above effect, one of the effects shown in this specification or another effect grasped from this specification may be achieved.

BRIEF DESCRIPTION OF DRAWINGS

FIG. 1 is an explanatory diagram for describing an example of a process in accordance with an information processing method according to the present embodiment.

DESCRIPTION OF EMBODIMENTS

Figure 2:
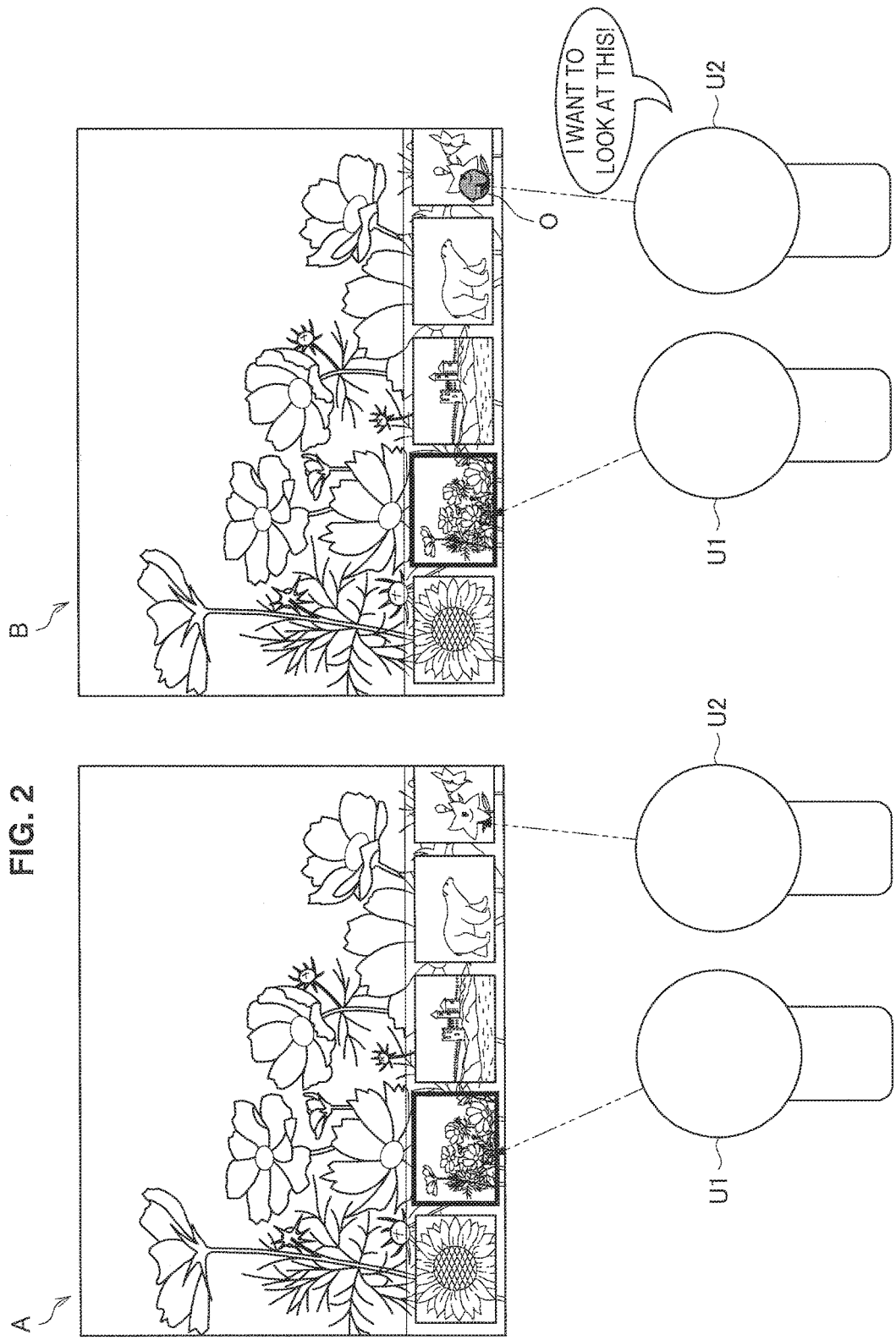
FIG. 2 is an explanatory diagram for describing an example of a process in accordance with an information processing method according to the present embodiment.

A preferred embodiment of the present disclosure will be described in detail below with reference to the appended drawings. Note that in this specification and the drawings, the same reference signs are attached to elements having substantially the same function and configuration, thereby omitting duplicate descriptions.

The description will be provided in the order shown below:

1. Information Processing Method According to the Present Embodiment
2. Information Processing Apparatus According to the Present Embodiment
3. Program According to the Present Embodiment (Information Processing Method According to the Present Embodiment)

Before describing the configuration of an information processing apparatus according to the present embodiment, an information processing method according to the present embodiment will first be described. The information processing method according to the present embodiment will be described by taking a case in which processing according to the information processing method according to the present embodiment is performed by an information processing apparatus according to the present embodiment as an example.

[1] Overview of Process According to Information Processing Method According to Present Embodiment As discussed above, a method of deciding an operator who performs an operation through line of sight in an apparatus that conducts a process based on a user's line of sight has not been established. Herein, an operator according to the present embodiment refers to the user who performs an action that affects the behavior of the apparatus (or an application being executed), for example. Note that, as discussed later, as an example of a process according to an information processing method according to the present embodiment, an information processing apparatus according to the present embodiment is also capable of conducting a process that does not affect the behavior of the apparatus (or an application being executed) on the basis of the line of sight of a user not determined to be the operator.

Accordingly, an information processing apparatus according to the present embodiment acquires a captured image of users (image acquisition process), and determines the operator from among the users included in the acquired captured image (determination process). Subsequently, an information processing apparatus according to the present embodiment conducts a process on the basis of information about the line of sight of the user corresponding to the determined operator (execution process).

Herein, a captured image of users according to the present embodiment refers to a captured image that may include users, for example. Herein, a captured image of users according to the present embodiment simply will be called the "captured image". The captured image according to the present embodiment may be a user-captured image viewable on a display screen, for example. In addition, the captured image according to the present embodiment may be generated by image capture in an imaging unit (discussed later) provided in an information processing apparatus according to the present embodiment, or an external imaging device. The captured image according to the present embodiment may be a moving image or a still image, for example.

The display screen according to the present embodiment is, for example, a display screen on which various images are displayed and toward which the user directs the line of sight. As the display screen according to the present embodiment, for example, the display screen of a display unit (described later) included in the information processing apparatus according to the present embodiment and the display screen of an external display apparatus (or an external display device) connected to the information processing apparatus according to the present embodiment wirelessly or via a cable can be cited.

In addition, information about user line of sight according to the present embodiment refers to information (data) about a user's eyes, such as the position of a user's line of sight on the display screen and a user's eye movements, for example. The information about user line of sight according to the present embodiment may be information about the position of the line of sight of a user and information about eye movements of a user, for example.

Here, the information about the position of the line of sight of the user according to the present embodiment is, for example, data showing the position of the line of sight of the user or data that can be used to identify the position of the line of sight of the user (or data that can be used to estimate the position of the line of sight of the user. This also applies below).

As the data showing the position of the line of sight of the user according to the present embodiment, for example, coordinate data showing the position of the line of sight of the user on the display screen can be cited. The position of the line of sight of the user on the display screen is represented by, for example, coordinates in a coordinate system in which a reference position of the display screen is set as its origin. The data showing the position of the line of sight of the user according to the present embodiment may include data indicating the direction of the line of sight (for example, data showing the angle with the display screen).

When coordinate data indicating the position of the line of sight of the user on the display screen is used as information about the position of the line of sight of the user according to the present embodiment, the information processing apparatus according to the present embodiment identifies the position of the line of sight of the user on the display screen by using, for example, coordinate data acquired from an external apparatus having identified (estimated) the position of the line of sight of the user by using line-of-sight detection technology and indicating the position of the line of sight of the user on the display screen. When the data indicating the direction of the line of sight is used as information about the position of the line of sight of the user according to the present embodiment, the information processing apparatus according to the present embodiment identifies the direction of the line of sight by using, for example, data indicating the direction of the line of sight acquired from the external apparatus.

It is possible to identify the position of the line of sight of the user and the direction of the line of sight of the user on the display screen by using the line of sight detected by using line-of-sight detection technology and the position of the user and the orientation of face with respect to the display screen detected from a captured image in which the direction in which images are displayed on the display screen is captured. However, the method of identifying the position of the line of sight of the user and the direction of the line of sight of the user on the display screen according to the present embodiment is not limited to the above method. For example, the information processing apparatus according to the present embodiment and the external apparatus can use any technology capable of identifying the position of the line of sight of the user and the direction of the line of sight of the user on the display screen.

As the line-of-sight detection technology according to the present embodiment, for example, a method of detecting the line of sight based on the position of a moving point (for example, a point corresponding to a moving portion in an eye such as the iris and the pupil) of an eye with respect to a reference point (for example, a point corresponding to a portion that does not move in the eye such as an eye's inner corner or corneal reflex) of the eye can be cited. However, the line-of-sight detection technology according to the present embodiment is not limited to the above technology and may be, for example, any line-of-sight detection technology capable of detecting the line of sight.

As the data that can be used to identify the position of the line of sight of the user according to the present embodiment, for example, captured image data in which the direction in which images (moving images or still images) are displayed on the display screen is imaged can be cited. The data that can be used to identify the position of the line of sight of the user according to the present embodiment may further include detection data of any sensor obtaining detection values that can be used to improve estimation accuracy of the position of the line of sight of the user such as detection data of an infrared sensor that detects infrared radiation in the direction in which images are displayed on the display screen.

When data that can be used to identify the position of the line of sight of the user is used as information about the position of the line of sight of the user according to the present embodiment, the information processing apparatus according to the present embodiment uses, for example, captured image data acquired by an imaging unit (described later) included in the local apparatus (hereinafter, referred to as the information processing apparatus according to the present embodiment) or an external imaging device. In the above case, the information processing apparatus according to the present embodiment may use, for example, detection data (example of data that can be used to identify the position of the line of sight of the user) acquired from a sensor that can be used to improve estimation accuracy of the position of the line of sight of the user included in the local apparatus or an external sensor. The information processing apparatus according to the present embodiment performs processing according to an identification method of the position of the line of sight of the user and the direction of the line of sight of the user on the display screen according to the present embodiment using, for example, data that can be used to identify the position of the line of sight of the user acquired as described above to identify the position of the line of sight of the user and the direction of the line of sight of the user on the display screen.

The information related to a user's eye movements according to the present embodiment may be, for example, data indicating the user's eye movements, or data that may be used to specify the user's eye movements (or data that may be used to estimate the user's eye movements. This applies similarly hereinafter.)

The data indicating a user's eye movements according to the present embodiment may be, for example, data indicating a predetermined eye movement, such as a single blink movement, multiple consecutive blink movements, or a wink movement (for example, data indicating a number or the like corresponding to a predetermined movement). In addition, the data that may be used to specify a user's eye movements according to the present embodiment may be, for example, captured image data depicting the direction in which an image (moving image or still image) is displayed on the display screen.

When data indicating a user's eye movements is used as the information related to a user's eye movements according to the present embodiment, the information processing apparatus according to the present embodiment determines that a predetermined eye movement has been performed by using data indicating the user's eye movements acquired from an external apparatus that specifies (or estimates) the user's eye movements on the basis of a captured image, for example.

Herein, for example, when a change in eye shape detected from a moving image (or a plurality of still images) depicting the direction in which an image is displayed on the display screen qualifies as a change in eye shape corresponding to a predetermined eye movement, it is possible to determine that the predetermined eye movement was performed. Note that the method of determining a predetermined eye movement according to the present embodiment is not limited to the above. For example, the information processing apparatus according to the present embodiment or an external apparatus is capable of using arbitrary technology enabling a determination that a predetermined eye movement was performed.

When data that may be used to specify a user's eye movements is used as the information related to a user's eye movements according to the present embodiment, the information processing apparatus according to the present embodiment uses captured image data (an example of data that may be used to specify a user's eye movements) acquired from an imaging unit (discussed later) provided in the local apparatus or an external imaging device, for example. The information processing apparatus according to the present embodiment uses the data that may be used to specify a user's eye movements acquired as above to conduct a process related to a method of determining a predetermined eye movement according to the present embodiment, and determine that the predetermined eye movement was performed, for example.

Hereinafter, processes according to an information processing method according to the present embodiment will be described more specifically.

[2] Processes According to Information Processing Method According to Present Embodiment (1) Image Acquisition Process The information processing apparatus according to the present embodiment acquires the captured image according to the present embodiment.

The information processing apparatus according to the present embodiment acquires the captured image according to the present embodiment by controlling image capture in an imaging unit (discussed later) provided in the information processing apparatus according to the present embodiment or an external imaging device, for example. The information processing apparatus according to the present embodiment controls image capture in the imaging unit (discussed later) or the like by transmitting control commands related image capture to the imaging unit (discussed later), the external imaging device, or the like via a communication unit (discussed later) or a connected external communication device.

Note that the image acquisition process according to the present embodiment is not limited to the above. For example, the information processing apparatus according to the present embodiment may also passively acquire the captured image according to the present embodiment transmitted from the imaging unit (discussed later) or the external imaging device.

(2) Determination Process

The information processing apparatus according to the present embodiment determines the operator from among the users included in a captured image acquired by the process of (1) above (image acquisition process). The information processing apparatus according to the present embodiment determines a single user or multiple users from among the users included in the captured image as the operator(s).

(2-1) First Example of Determination Process

The information processing apparatus according to the present embodiment determines the operator on the basis of the size of a face region detected from the captured image, for example.

Herein, the face region according to the present embodiment refers to a region including the face portion of a user in the captured image. The information processing apparatus according to the present embodiment detects the face region by detecting features such as the user's eyes, nose, mouth, and bone structure from the captured image, or by detecting a region resembling a luminance distribution and structure pattern of a face from the captured image, for example. Note that the method of detecting the face region according to the present embodiment is not limited to the above, and the information processing apparatus according to the present embodiment may also use arbitrary technology enabling the detection of a face from the captured image.

(2-1-1) Process in the Case of Determining Single User from Among Users Included in Captured Image as the Operator The information processing apparatus according to the present embodiment determines the operator to be a single user corresponding to the face region having the largest face region size from among face regions detected from the captured image, for example.

At this point, regions having the same (or approximately the same) face region size may be included among the face regions detected from the captured image.

Accordingly, when there exist multiple face regions having the largest face region size among the face regions detected from the captured image, the information processing apparatus according to the present embodiment determines the operator to be the user corresponding to the face region detected earlier, for example.

By determining as the operator the user corresponding to the face region detected earlier as above, for example, the information processing apparatus according to the present embodiment is able to determine a single user as the operator, even when face regions are the same (or approximately the same) size.

Note that the method of determining the operator when there exist multiple face regions having the largest face region size among the face regions detected from the captured image is not limited to the above.

For example, the information processing apparatus according to the present embodiment may also determine the operator to be the user corresponding to the face region detected later, or determine from among the face regions detected from the captured image a single user as the operator by following a configured rule (such as randomly, for example).

In addition, the information processing apparatus according to the present embodiment may also determine a single user as the operator by combining one or multiple processes from among the determination process according to the second example discussed later to the determination process according to the fifth example discussed later, for example. By determining the operator according to a process combining the determination process according to the first example with a determination process according to another example, it becomes possible to prevent the operator from changing frequently, for example.

The information processing apparatus according to the present embodiment determines a single user as the operator on the basis of the size of a face region detected from the captured image as above, for example.

Note that the process in the case of determining a single user as the operator in the determination process according to the first example according to the present embodiment is not limited to the above.

For example, the information processing apparatus according to the present embodiment may also determine that a user who had been determined to be the operator on the basis of the size of a face region detected from the captured image is not the operator.

For example, the information processing apparatus according to the present embodiment computes a first difference value indicating the difference in the size of a face region corresponding to the user determined to be the operator from the size of a face region corresponding to a user not determined to be the operator (hereinafter called an "other user") from among the users included in the captured image. Subsequently, when the first difference value is equal to or greater than a configured first threshold value (or when the first difference value is greater than the first threshold value), the information processing apparatus according to the present embodiment determines that the user who had been determined to be the operator is not the operator.

The first threshold value may be a fixed value configured in advance, or a variable value that may be set appropriately by user operations or the like, for example. The degree to which the user determined to be the operator continues to be the operator changes according to the magnitude of the configured value of the first threshold value. Specifically, in the case in which the value of the first threshold value is 0 (zero), the user who had been determined to be the operator is determined not to be the operator when the size of the face region corresponding to the user determined to be the operator becomes smaller than the size of a face region corresponding to another user (or when the size of the face region corresponding to the user determined to be the operator becomes less than or equal to the size of a face region corresponding to another user). Also, as the value of the first threshold value becomes larger, the value of the first difference value needed for the user who had been determined to be the operator to be determined not to be the operator becomes larger, and thus the user who had been determined to be the operator is less likely to be determined not to be the operator.

(2-1-2) Process in the Case of Determining Multiple Users from Among Users Included in Captured Image as the Operator The information processing apparatus according to the present embodiment determines the operator to be users up to a configured number of people in order of largest face region size detected from the captured image, for example. More specifically, the information processing apparatus according to the present embodiment determines, as the operator, users up to a configured number of people or a number of users less than the configured number of people, in order of largest face region size detected from the captured image, for example.

Herein, the configured number of people in the determination process according to the first example may be fixed, or varied by user operations or the like.

In addition, when the configured number of people is exceeded as a result of operator candidates being selected in order of largest face region size detected from the captured image due to face regions being the same size, the information processing apparatus according to the present embodiment does not determine the operator to be a user corresponding to a face region detected later from among the face regions having the same face region size, for example. Note that the method of determining the operator in the above case obviously is not limited to the above.

The information processing apparatus according to the present embodiment determines multiple users as the operator on the basis of the sizes of face regions detected from the captured image as above, for example.

(2-2) Second Example of Determination Process

The information processing apparatus according to the present embodiment determines the operator on the basis of a distance, from the display screen, of a user corresponding to a face region detected from the captured image (hereinafter called the "distance corresponding to a face region"), for example. The information processing apparatus according to the present embodiment determines a single user or multiple users from among the users included in the captured image as the operator(s).

Herein, the "distance, from the display screen, of a user corresponding to a face region included in the captured image" according to the present embodiment is specified (or estimated) on the basis of a depth map captured by a method such as time of flight (TOF), for example. In addition, the information processing apparatus according to the present embodiment is also capable of specifying (or estimating) the "distance, from the display screen, of a user corresponding to a face region included in the captured image" according to the present embodiment on the basis of a face region detected from the captured image and a detection value from a depth sensor using infrared or the like, for example. In addition, the information processing apparatus according to the present embodiment may also specify the "distance, from the display screen, of a user corresponding to a face region included in the captured image" by specifying (or estimating) the coordinates of a face region using arbitrary technology, and computing the distance to the coordinates of a reference position, for example. Herein, the coordinates of the face region and the coordinates of the reference position are expressed as coordinates in a three-dimensional coordinate system made up of two axes representing a plane corresponding to the display screen and one axis representing the vertical direction with respect to the display screen, for example. Note that the method of specifying (or the method of estimating) the "distance, from the display screen, of a user corresponding to a face region included in the captured image" according to the present embodiment obviously is not limited to the above.

(2-2-1) Process in the Case of Determining Single User from Among Users Included in Captured Image as the Operator The information processing apparatus according to the present embodiment determines the operator to be a single user corresponding to the face region having the shortest distance corresponding to a face region, for example.

At this point, distances corresponding to a face region having the same (or approximately the same) distance may be included among the distances corresponding to a face region according to the present embodiment which correspond to face regions detected from the captured image.

Accordingly, when there exist multiple distances corresponding to a face region having the same (or approximately the same) distance among the distances corresponding to a face region according to the present embodiment, the information processing apparatus according to the present embodiment determines the operator to be the user corresponding to the face region detected earlier, for example.

By determining as the operator the user corresponding to the face region detected earlier as above, for example, the information processing apparatus according to the present embodiment is able to determine a single user as the operator, even when there exist multiple distances corresponding to a face region having the same (or approximately the same) distance.

Note that the method of determining the operator when there exist multiple distances corresponding to a face region having the same (or approximately the same) distance among the distances corresponding to a face region according to the present embodiment which correspond to face regions detected from the captured image is not limited to the above.

For example, the information processing apparatus according to the present embodiment may also determine the operator to be the user corresponding to the face region detected later, or determine from among the face regions detected from the captured image a single user as the operator by following a configured rule (such as randomly, for example).

In addition, the information processing apparatus according to the present embodiment may also determine a single user as the operator by combining one or multiple processes from among the determination process according to the first example above and the determination process according to the third example discussed later to the determination process according to the fifth example discussed later, for example. By determining the operator according to a process combining the determination process according to the third example with a determination process according to another example, it becomes possible to prevent the operator from changing frequently, for example.

The information processing apparatus according to the present embodiment determines a single user as the operator on the basis of the distance corresponding to a face region according to the present embodiment, which corresponds to a face region detected from the captured image as above, for example.

Note that the process in the case of determining a single user as the operator in the determination process according to the second example according to the present embodiment is not limited to the above. For example, the information processing apparatus according to the present embodiment may also determine that a user who had been determined to be the operator on the basis of the length of the distance corresponding to a face region according to the present embodiment which corresponds to a face region captured from the captured image is not the operator.

For example, the information processing apparatus according to the present embodiment computes a second difference value indicating the difference in the distance corresponding to a face region corresponding to another user from the distance corresponding to a face region corresponding to the user determined to be the operator. Subsequently, when the second difference value is equal to or greater than a configured second threshold value (or when the second difference value is greater than the second threshold value), the information processing apparatus according to the present embodiment determines that the user who had determined to be the operator is not the operator.

The second threshold value may be a static value configured in advance, or a variable value that may be set appropriately by user operations or the like, for example. The degree to which the user determined to be the operator continues to be the operator changes according to the magnitude of the configured value of the second threshold value. Specifically, in the case in which the value of the second threshold is 0 (zero), the user who had been determined to be the operator is determined not to be the operator when the distance corresponding to the face region corresponding to the user determined to be the operator becomes shorter than the distance corresponding to a face region corresponding to another user (or when the distance corresponding to the face region corresponding to the user determined to be the operator becomes less than or equal to the distance corresponding to a face region corresponding to another user). Also, as the value of the second threshold value becomes larger, the value of the second difference value needed for the user who had been determined to be the operator to be determined not to be the operator becomes larger, and thus the user who had been determined to be the operator is less likely to be determined not to be the operator.

(2-2-2) Process in the Case of Determining Multiple Users from Among Users Included in Captured Image as the Operator The information processing apparatus according to the present embodiment determines the operator to be users up to a configured number of people in order of shortest distance corresponding to a face region, for example. More specifically, the information processing apparatus according to the present embodiment determines, as the operator, users up to a configured number of people or a number of users less than the configured number of people, in order of shortest distance corresponding to a face region, for example.

Herein, the configured number of people in the determination process according to the second example may be fixed, or varied by user operations or the like.

In addition, when the configured number of people is exceeded as a result of operator candidates being selected in order of shortest distance corresponding to a face region due to distances corresponding to a face region according to the present embodiment which correspond to face regions detected from the captured image being the same, the information processing apparatus according to the present embodiment does not determine the operator to be a user corresponding to a face region detected later from among the face regions having the same face distance corresponding to a face region, for example. Note that the method of determining the operator in the above case obviously is not limited to the above.

The information processing apparatus according to the present embodiment determines multiple users as the operator on the basis of the distance corresponding to a face region according to the present embodiment which corresponds to a face region detected from the captured image as above, for example.

(2-3) Third Example of Determination Process

The information processing apparatus according to the present embodiment determines the operator on the basis of a predetermined gesture detected from the captured image, for example.

Herein, the predetermined gesture according to the present embodiment may be various gestures, such as a gesture of raising a hand, or a gesture of waving a hand, for example.

For example, in the case of detecting a gesture of raising a hand, the information processing apparatus according to the present embodiment respectively detects the face region and the hand from the captured image. Subsequently, if the detected hand exists within a region corresponding to the face region (a region configured to determine that a hand was raised), the information processing apparatus according to the present embodiment detects the gesture of raising a hand by determining that the user corresponding to the relevant face region raised a hand.

As another example, in the case of detecting a gesture of waving a hand, the information processing apparatus according to the present embodiment respectively detects the face region and the hand from the captured image. Subsequently, if the detected hand is detected within a region corresponding to the face region (a region configured to determine that a hand was waved), and the frequency of luminance change in the captured image is equal to or greater than a configured predetermined frequency (or the frequency of the luminance change is greater than the predetermined frequency), the information processing apparatus according to the present embodiment detects the gesture of waving a hand by determining that the user corresponding to the relevant face region waved a hand.

Note that the predetermined gesture according to the present embodiment and the method of detecting the predetermined gesture according to the present embodiment are not limited to the above. The information processing apparatus according to the present embodiment may also detect an arbitrary gesture, such as a gesture of pointing a finger, by using an arbitrary method enabling detection from the captured image, for example.

(2-3-1) Process in the Case of Determining Single User from Among Users Included in Captured Image as the Operator The information processing apparatus according to the present embodiment determines, as the operator, a user for which a predetermined gesture was detected earlier from the captured image, for example.

Note that in the determination process according to the third example, the process of determining a single user as the operator is not limited to the above.

For example, when there exist multiple users for which a predetermined gesture was detected from the captured image, the information processing apparatus according to the present embodiment may determine the operator to be a user for which a predetermined gesture was detected later, for example. Also, in the above case, the information processing apparatus according to the present embodiment may also determine from among the users for which a predetermined gesture was detected from the captured image a single user as the operator by following a configured rule (such as randomly, for example). Furthermore, in the above case, the information processing apparatus according to the present embodiment may also determine a single user as the operator by combining the determination process according to the first example above, the determination process according to the second example above, the determination process according to the fourth example discussed later, and the determination process according to the fifth example discussed later, for example.

(2-3-2) Process in the Case of Determining Multiple Users from Among Users Included in Captured Image as the Operator The information processing apparatus according to the present embodiment determines the operator to be users up to a configured number of people in order of a predetermined gesture being detected from the captured image, for example. More specifically, the information processing apparatus according to the present embodiment determines the operator to be users up to a configured number of people or a number of users less than the configured number of people, in order of a predetermined gesture being detected from the captured image, for example.

Herein, the configured number of people in the determination process according to the third example may be fixed, or varied by user operations or the like.

Note that in the determination process according to the third example, the process of determining multiple users as the operator is not limited to the above.

For example, the information processing apparatus according to the present embodiment may also determine the operator to be users up to the configured number of people selected from among the users for which a predetermined gesture was detected from the captured image by following a configured rule (such as randomly, for example).

(2-4) Fourth Example of Determination Process

When the position of a user's line of sight on the display screen is included in a configured region on the display screen, the information processing apparatus according to the present embodiment determines the operator to be the user corresponding to the relevant line of sight, for example.

Herein, the information processing apparatus according to the present embodiment uses the position of a line of sight of a user on the display screen, which is indicated by the information about the line of sight of a user according to the present embodiment. Also, the configured region on the display screen according to the present embodiment may be a fixed region configured in advance on the display screen, a region in which a predetermined object, such as an icon or character image, is displayed on the display screen, or a region configured by a user operation or the like on the display screen, for example.

(2-4-1) Process in the Case of Determining Single User from Among Users Included in Captured Image as the Operator The information processing apparatus according to the present embodiment determines the operator to be a user for which the position of the user's line of sight was detected earlier within a configured region on the display screen, for example.

Note that in the determination process according to the fourth example, the process of determining a single user as the operator is not limited to the above.

For example, when there exist multiple users for which a line of sight was detected within the configured region on the display screen, the information processing apparatus according to the present embodiment may determine the operator to be a user for which the position of the user's line of sight was detected later within the configured region on the display screen, for example. Also, in the above case, the information processing apparatus according to the present embodiment may also determine, from among the users for which the position of the user's line of sight is included within the configured region on the display screen, a single user as the operator by following a configured rule (such as randomly, for example). Furthermore, in the above case, the information processing apparatus according to the present embodiment may also determine a single user as the operator by combining the determination process according to the first example above, the determination process according to the second example above, the determination process according to the third example above, and the determination process according to the fifth example discussed later, for example.

(2-4-2) Process in the Case of Determining Multiple Users from Among Users Included in Captured Image as the Operator The information processing apparatus according to the present embodiment determines the operator to be users up to a configured number of people in order of the position of the user's line of sight being detected within a configured region on the display screen, for example. More specifically, the information processing apparatus according to the present embodiment determines the operator to be users up to a configured number of people or a number of users less than the configured number of people, in order of the position of the user's line of sight being detected within the configured region on the display screen, for example.

Herein, the configured number of people in the determination process according to the fourth example may be fixed, or varied by user operations or the like.

Note that in the determination process according to the fourth example, the process of determining multiple users as the operator is not limited to the above.

For example, the information processing apparatus according to the present embodiment may also determine the operator to be users up to the configured number of people selected from among the users for which the position of the user's line of sight is included within the configured region on the display screen by following a configured rule (such as randomly, for example).

(2-5) Fifth Example of Determination Process

The information processing apparatus according to the present embodiment identifies a user included a captured image on the basis of the captured image, for example. Subsequently, the information processing apparatus according to the present embodiment determines the operator on the basis of a ranking associated with the identified user.

Herein, a ranking according to the present embodiment refers to a value indicating an index by which the information processing apparatus according to the present embodiment preferentially determines the operator, for example. In the ranking according to the present embodiment, the priority of ranking may be high to the extent that the value is small, or the priority of ranking may be high to the extent that the value is large, for example.

More specifically, the information processing apparatus according to the present embodiment detects a face region from the captured image, and conducts a face recognition process on the detected face region to extract face information (data) indicating features of a user's face, for example. Subsequently, the information processing apparatus according to the present embodiment uses a table (or database) associating a user ID uniquely indicating a user with face information and the extracted face information to identify the user by specifying the user ID corresponding to the face information, for example.

Herein, the user ID uniquely indicating a user according to the present embodiment additionally may be associated with the execution state of an application and/or information related to the calibration of a user interface (UI), for example. The information related to UI calibration may be data indicating positions where objects such as icons are arranged on the display screen, for example. By additionally associating the user ID uniquely indicating a user according to the present embodiment with the execution state of an application or the like, the information processing apparatus according to the present embodiment is able to manage identifiable users in greater detail, and also provide to a identifiable user various services corresponding to that user.

Note that the method of identifying a user based on the captured image according to the present embodiment is not limited to the above.

For example, the information processing apparatus according to the present embodiment may also use a table (or a database) associating a user ID indicating a user type, such as an ID or the like indicating whether the user is an adult or a child, with face information and extracted face information to specify a user ID corresponding to a face region, and thereby specify a user type.

After users are identified, the information processing apparatus according to the present embodiment uses a table (or database) associating a user ID with a ranking value and the specified user ID to specify the ranking corresponding to the identified users. Subsequently, the information processing apparatus according to the present embodiment determines the operator on the basis of the specified ranking.

By determining the operator on the basis of a ranking as above, for example, the information processing apparatus according to the present embodiment is able to realize the following. Obviously, however, an example of a determination process according to the fifth example is not limited to the examples given below.

When the ranking of a father is highest from among the users identifiable by the information processing apparatus according to the present embodiment, the information processing apparatus according to the present embodiment determines the operator to be the father while the father is being identified from the captured image (an example of a case in which the information processing apparatus according to the present embodiment determines the operator of equipment used at home).

When the ranking of an adult is higher than a child from among the user identifiable by the information processing apparatus according to the present embodiment, if a child user and an adult user are included in the captured image, the information processing apparatus according to the present embodiment determines the operator to be the adult while the adult is being identified from the captured image.

(2-5-1) Process in the Case of Determining Single User from Among Users Included in Captured Image as the Operator The information processing apparatus according to the present embodiment determines the operator to be the user with the highest ranking associated with a user identified on the basis of the captured image, for example.

Note that in the determination process according to the fifth example, the process of determining a single user as the operator is not limited to the above.

For example, when there exist multiple users having the highest ranking, the information processing apparatus according to the present embodiment may determine the operator to be the user whose face region was detected earlier from the captured image or the user identified earlier on the basis of the captured image from among the users having the highest ranking, for example. Also, in the above case, the information processing apparatus according to the present embodiment may also determine from among the users having the highest ranking a single user as the operator by following a configured rule (such as randomly, for example).

(2-5-2) Process in the Case of Determining Multiple Users from Among Users Included in Captured Image as the Operator The information processing apparatus according to the present embodiment determines the operator to be users up to a configured number of people in order of highest ranking, for example. More specifically, the information processing apparatus according to the present embodiment determines the operator to be users up to a configured number of people or a number of users less than the configured number of people, in order of highest ranking, for example.

Herein, the configured number of people in the determination process according to the fifth example may be fixed, or varied by user operations or the like.

In addition, when the configured number of people is exceeded as a result of operator candidates being selected in order of highest ranking due to rankings being the same, the information processing apparatus according to the present embodiment does not determine the operator to be a user whose face region was detected later from the captured image or a user identified later on the basis of the captured image from among the users having the same ranking, for example. Note that the method of determining the operator in the above case obviously is not limited to the above.

(2-6) Sixth Example of Determination Process

The information processing apparatus according to the present embodiment may also determine the operator when speech indicating configured predetermined spoken content is additionally detected for a user determined to be the operator in each of the determination process according to the first example indicated in (2-1) above to the determination process according to the fifth example indicated in (2-5) above.

The information processing apparatus according to the present embodiment detects the speech indicating predetermined spoken content by performing speech recognition using source separation or source localization, for example. Herein, source separation according to the present embodiment refers to technology that extracts only speech of interest from among various sounds. Also, source localization according to the present embodiment refers to technology that measures the position (angle) of a sound source.

As a determination process according to the present embodiment, the information processing apparatus according to the present embodiment determines the operator from among users included in the captured image on the basis of the captured image by conducting one of the processes from the determination process according to the first example indicated in (2-1) above to the determination process according to the sixth example indicated in (2-6) above, for example.

Note that the process of determining the operator from among users included in the captured image on the basis of the captured image in a determination process according to the present embodiment is not limited to being from the determination process according to the first example indicated in (2-1) above to the determination process according to the sixth example indicated in (2-6) above. For example, the information processing apparatus according to the present embodiment may also determine the operator according to a detection order of faces detected from the captured image. Examples of determining the operator according to a face detection order include taking the operator to be the user whose face was detected first, or taking the operator to be users equal to a configured number of people in order of face detection, for example.

Also, the determination process according to the present embodiment is not limited to being a process of determining the operator from among users included in the captured image. The information processing apparatus according to the present embodiment is also capable of conducting one or more of the processes from the determination process according to the seventh example indicated below to the determination process according to the tenth example indicated below as the determination process according to the present embodiment, for example.

(2-7) Seventh Example of Determination Process

For example, the information processing apparatus according to the present embodiment configures an operation level for a user determined to be the operator.

Herein, the operation level according to the present embodiment refers to a value indicating an index related to a range of operations that may be performed using line of sight by the determined operator, for example. The operation level according to the present embodiment is associated with a range of operations that may be performed using line of sight by a table (or a database) associating the operation level according to the present embodiment with information about operations that may be performed using line of sight, for example. The information about operations according to the present embodiment may be, for example, various data for realizing operations, such as data indicating operated-related commands or parameters, or data for executing an operation-related application (such as an address where an application is stored, and parameters, for example).

When an operation level is configured in the determination process according to the present embodiment, the information processing apparatus according to the present embodiment conducts a process corresponding to the operator's line of sight on the basis of the configured operation level in an execution process according to the present embodiment discussed later. In other words, when an operation level is configured in the determination process according to the present embodiment, the information processing apparatus according to the present embodiment is able to dynamically change the processes that the determined operator may perform on the basis of the configured operation level, for example.

The information processing apparatus according to the present embodiment configures the configured operation level for a user determined to be the operator, for example.

In addition, when the user determined to be the operator is identified on the basis of the captured image, the information processing apparatus according to the present embodiment may configure an operation level corresponding to the identified user, for example. The information processing apparatus according to the present embodiment configures an operation level corresponding to the identified user by using a table (or database) associating a user ID with an operation level and the user ID corresponding to the user identified on the basis of the captured image, for example.

(2-8) Eighth Example of Determination Process

As a determination process according to the present embodiment, the information processing apparatus according to the present embodiment may also determine that a user who had been determined to be the operator is not the operator.

The information processing apparatus according to the present embodiment determines that a user who had been determined to be the operator is not the operator when information about the line of sight of a user corresponding to the user determined to be the operator cannot be acquired from the captured image, for example. As above, in the case of determining that a user is not the operator on the basis of information about the line of sight of a user corresponding to the user determined to be the operator, the information processing apparatus according to the present embodiment determines that the user who had been determined to be the operator is not the operator when the user determined to be the operator stops directing his or her line of sight towards the display screen, for example.

Note that the process of determining that a user who had been determined to be the operator is not the operator according to the present embodiment is not limited to the above.

For example, the cause for being unable to acquire information about the line of sight of a user corresponding to the user determined to be the operator from the captured image may be, for example, that the user determined to be the operator is no longer included in the captured image, or that the user determined to be the operator is included in the captured image, but is not looking at the display screen. Additionally, when information about the line of sight of a user cannot be acquired from the captured image because the user determined to be the operator is included in the captured image, but is not looking at the display screen, and the information processing apparatus according to the present embodiment determines that the user who had been determined to be the operator is not the operator, there is a risk of loss of convenience for the user who had been determined to be the operator.

Accordingly, even when information about the line of sight of a user corresponding to the user determined to be the operator cannot be acquired from the captured image, if the head of the user determined to be the operator is detected, the information processing apparatus according to the present embodiment does not determine that the user who had been determined to be the operator is not the operator.

The information processing apparatus according to the present embodiment detects a user's head from the captured image by detecting a shape corresponding to a head (such as a circular shape or an elliptical shape, for example) from the captured image, or by detecting luminance changes or the like in the captured image. The information processing apparatus according to the present embodiment detects the head of the user determined to be the operator by conducting a process related to the detection of a user's head on a partial region of the captured image that includes a region in which a face region corresponding to the user determined to the operator was detected, for example. Note that the process related to the detection of a user's head and the method of detecting the head of the user determined to be the operator according to the present embodiment are not limited to the above. For example, the information processing apparatus according to the present embodiment may also detect the head of the user determined to be the operator by using an arbitrary method and process enabling the detection of the head of the user determined to be the operator, such as a method that uses detection results from various sensors such as an infrared sensor.

As above, when the head of the user determined to be the operator is detected, by not determining that the user who had been determined to be the operator is not the operator, even if the user who had been determined to be the operator hypothetically looks away from the display screen, that user still remains the operator. Thus, as above, when the head of the user determined to be the operator is detected, by not determining that the user who had been determined to be the operator is not the operator, a reduction in the convenience of the user who had been determined to be the operator may be prevented.

(2-9) Ninth Example of Determination Process

The determination process according to the eighth example above illustrates a process in which the information processing apparatus according to the present embodiment determines that the user who had been determined to be the operator is not the operator, on the basis of information about the line of sight of a user. When the determination process according to the eighth example above is used, it is possible to change the operator determined by the information processing apparatus according to the present embodiment, such as by having the user who is the operator hide his or her face so that information about the line of sight of a user is not acquired, or by having the user who is the operator move to a position where his or her head is not detected from the captured image, for example.

However, the method of changing the operator according to the present embodiment is not limited to a method using the determination process according to the eighth example above. For example, the information processing apparatus according to the present embodiment may also actively change the operator from a user who had been determined to be the operator to another user, on the basis of a predetermined combination of gestures by the user determined to be the operator and the other user.

More specifically, the information processing apparatus according to the present embodiment detects a predetermined combination of gestures by the user determined to be the operator and the other user, for example. The information processing apparatus according to the present embodiment detects the predetermined combination of gestures by using a method related to arbitrary gesture recognition technology, such as a method that uses image processing on the captured image, or a method utilizing detection values from an arbitrary sensor such as a depth sensor, for example.

Subsequently, when the predetermined combination of gestures by the user determined to be the operator and the other user is detected from the captured image, the information processing apparatus according to the present embodiment changes the operator from the user who had been determined to be the operator to the other user.

FIG. 1 is an explanatory diagram for describing an example of a process in accordance with an information processing method according to the present embodiment. A and B illustrated in FIG. 1 illustrate respective examples of a predetermined combination of gestures by a user determined to be the operator and another user detected by the information processing apparatus according to the present embodiment. In FIG. 1, the user U1 represents the user determined to be the operator, while the user U2 represents the other user.

When the predetermined combination of gestures by the user determined to be the operator and the other user, such as the high-five gesture illustrated in A of FIG. 1 or the hand-raising gesture illustrated in B of FIG. 1, is detected from the captured image, the information processing apparatus according to the present embodiment changes the operator from the user UI to the user U2. Obviously, however, an example of a predetermined combination of gestures by the user determined to be the operator and the other user according to the present embodiment is not limited to the examples illustrated in FIG. 1.

By having the information processing apparatus according to the present embodiment conduct the determination process according to the ninth example as above, the users are able to change the operator intentionally by performing gestures, even when the number of users determined to be the operator has reached a configured upper limit.

(2-10) Tenth Example of Determination Process

When the number of users determined to be the operator has not reached a configured upper limit (or alternatively, when an upper limit on the number of users determined to be the operator is not configured; this applies similarly hereinafter), the information processing apparatus according to the present embodiment determines the operator to be a user newly included in the captured image as a result of conducting the process in the case of determining the operator to be multiple users in a process from the determination process according to the first example indicated in (2-1) above to the determination process according to the sixth example indicated in (2-6) above, for example.

Note that the process related to the determination of the operator in the case in which the number of users determined to be the operator has not reached a configured upper limit is not limited to the above.

For example, depending on the application executed in the execution process according to the present embodiment discussed later, immediately determining the operator to be a user newly included in the captured image is not desirable in some cases. Accordingly, the information processing apparatus according to the present embodiment may also conduct a process as given below, for example, when a user is newly included in the captured image while the number of users determined to be the operator has not reached a configured upper limit, for example. In addition, the information processing apparatus according to the present embodiment may also conduct a process selected by a user operation or the like from among the above process of determining the operator to be a user newly included in the captured image or the processes given below, for example.

- The user newly included in the captured image is not determined to be the operator until a configured time elapses after the application is executed
- The user newly included in the captured image is selectively determined to be the operator according to the execution state of the application (3) Execution Process The information processing apparatus according to the present embodiment conducts a process on the basis of the information about the line of sight of the user corresponding to the operator determined in the process of (2) above (determination process).

Herein, the process based on the information about the line of sight of a user according to the present embodiment may be various processes using the information about the line of sight of a user according to the present embodiment, such as a process of selecting an object existing at the position of the line of sight indicated by the information about the position of the line of sight of a user (an example of information about the line of sight of a user), a process of moving an object depending on the position of the line of sight indicated by the information about the position of the line of sight of a user, a process associated with an eye movement indicated by information about the eye movements of a user (an example of information about the line of sight of a user), and a process of controlling, on the basis of an eye movement indicated by information about the eye movements of a user, the execution state of an application or the like corresponding to the position of the line of sight indicated by the information about the position of the line of sight of a user, for example. In addition, the above object according to the present embodiment may be various objects displayed on the display screen, such as an icon, a cursor, a message box, and a text string or image for notifying the user, for example.

In addition, the information processing apparatus according to the present embodiment may also conduct, as the process based on the information about the line of sight of a user according to the present embodiment, a control process that causes an external apparatus communicable via a communication unit (discussed later) or a connected external communication device to conduct a process based on the information about the line of sight of the user corresponding to the operator, for example. In the case of conducting the above control process, the information processing apparatus according to the present embodiment causes the communication unit (discussed later) or the like to transmit to the external apparatus data including the information about the line of sight of the user corresponding to the operator determined in the process of (2) above (determination process) and a command causing a process to be conducted, for example.

In the case of conducting the above control process as the execution process according to the present embodiment, the information processing apparatus according to the present embodiment is able to utilize data which is acquired from the external apparatus and which indicates a result of the process based on the information about the line of sight of the user corresponding to the operator conducted in the external apparatus, for example.

Note that the execution process according to the present embodiment is not limited to the above. For example, the information processing apparatus according to the present embodiment may also conduct the execution process according to the first example indicated below or the execution process according to the second example indicated below as the execution process according to the present embodiment.

(3-1) First Example of Execution Process

When an operation level is configured for the user determined to be the operator in the process of (2) above (determination process), the information processing apparatus according to the present embodiment conducts a process based on information about the line of sight of a user within a range of processes associated with the relevant operation level, on the basis of the operation level configured for the user determined to be the operator, for example. In other words, in the case of conducting the execution process according to the first example, the information processing apparatus according to the present embodiment is able to dynamically change the available processes on the basis of the operation level configured for the user determined to be the operator, for example.

The information processing apparatus according to the present embodiment specifies information about an operation corresponding to a configured operation level in the process of (2) above (determination process) with a table (or a database) associating the operation level according to the present embodiment with information about operations that may be performed using line of sight, for example. By specifying information about operations corresponding to an operation level, it becomes possible to recognize a range of processes associated with an operation level. Subsequently, the information processing apparatus according to the present embodiment conducts a process on the basis of the information about the line of sight of a user, within the range of processes associated with the operation level. Obviously, however, an example of an execution process according to the first example is not limited to the example given above.

(3-2) Second Example of Execution Process

The information processing apparatus according to the present embodiment utilizes the line of sight of the other user not determined to be the operator in the process of (2) above (determination process), and conducts a process on the basis of information about the line of sight of the user corresponding to the other user, for example.

Herein, the process based on information about the line of sight of the user corresponding to the other user according to the present embodiment may be a process that excludes processing that would affect the behavior of the apparatus, for example. This is because the other user according to the present embodiment is not the user determined to be the operator.

To give a specific example, the process based on information about the line of sight of the user corresponding to the other user according to the present embodiment may be a process that causes an object indicating the position of the line of sight to be displayed at the position of the line of sight indicated by the information about the line of sight of the user corresponding to the other user, for example. As above, by causing an object indicating the position of the line of sight to be displayed at the position of the line of sight indicated by the information about the line of sight of the user corresponding to the other user, it becomes possible to visually express the endpoint of the other user's line of sight on the display screen.

Note that the execution process according to the second example is not limited to the above.

For example, when the process based on information about the line of sight of the user corresponding to the other user according to the present embodiment causes an object indicating the position of the line of sight to be displayed at the position of the line of sight indicated by the information about the line of sight of the user corresponding to the other user, if the endpoint of the other user's line of sight is always displayed on the display screen, there is a risk that the operator, the other user, or the like may feel irritated.

Accordingly, the information processing apparatus according to the present embodiment may also selectively conduct a process based on information about user line of sight corresponding to the other user. To give an example of the case in which the information processing apparatus according to the present embodiment causes an object indicating the position of the line of sight to be displayed at the position of the line of sight indicated by information about user line of sight corresponding to the other user, the information processing apparatus according to the present embodiment selectively causes an object indicating the position of the line of sight to be displayed at the position of the line of sight indicated by information about user line of sight corresponding to the other user, for example.

More specifically, the information processing apparatus according to the present embodiment conducts a process on the basis of the information about user line of sight when predetermined speech spoken by the other user is recognized as a result of conducting speech recognition on an acquired speech signal, for example. In addition, the information processing apparatus according to the present embodiment does not conduct a process based on the information about user line of sight when predetermined speech spoken by the other user is not recognized.

Herein, a speech signal according to the present embodiment is generated by a speech input device provided in the information processing apparatus according to the present embodiment or a speech input device external to the information processing apparatus according to the present embodiment. The information processing apparatus according to the present embodiment processes a speech signal acquired from the speech input device. Herein, the speech input device according to the present embodiment may be a speech input device capable of generating a speech signal corresponding to the speech of a specific user, such as a speech input device capable of conducting source separation or a speech input device capable of conducting source localization.

Additionally, the predetermined speech according to the present embodiment may be speech indicating a demonstrative pronoun such as "this" and "that" or the like. Obviously, however, the predetermined speech according to the present embodiment is not limited to being speech indicating a demonstrative pronoun.

FIG. 2 is an explanatory diagram for describing an example of a process in accordance with an information processing method according to the present embodiment. FIG. 2 illustrates an example of the case of selectively conducting a process based on information about user line of sight corresponding to the other user according to the present embodiment. In FIG. 2, the user U1 represents the user determined to be the operator, while the user U2 represents the other user.

As illustrated in A of FIG. 2, when predetermined speech spoken by the user U2 is not recognized, such as when the user U2 who is the other user is not speaking, the information processing apparatus according to the present embodiment does not conduct a process based on information about user line of sight corresponding to the user U2.

Additionally, as illustrated in B of FIG. 2, when predetermined speech such as "this" spoken by the user U2 who is the other user is recognized, the information processing apparatus according to the present embodiment causes an object O to be displayed at the position of the line of sight indicated by information about user line of sight corresponding to the user U2, for example.

By having the endpoint of the line of sight of the user U2 who is the other user be displayed like the object O in B of FIG. 2, for example, the user U2 is able to inform people such as the user U1 who is the operator of something of interest being displayed on the display screen. Additionally, since the information processing apparatus according to the present embodiment selectively causes the object O to be displayed when predetermined speech is recognized, the likelihood of the operator, another user, or the like feeling irritated is reduced, or the irritation may be decreased.

Note that, although not illustrated in FIG. 2, the information processing apparatus according to the present embodiment may also display the object O illustrated in B of FIG. 2, and then hide the object O, for example. The information processing apparatus according to the present embodiment may hide the object O after a configured time elapses after the display of the object O, or hide the object O if the position of the line of sight indicated by the information about user line of sight corresponding to the user U2 who is the other user does not move for a configured time, for example.

The information processing apparatus according to the present embodiment conducts the process of (1) above (image acquisition process), the process of (2) above (determination process), and the process of (3) above (execution process) as a process in accordance with an information processing method according to the present embodiment, for example. Herein, in the process of (2) above (determination process), the information processing apparatus according to the present embodiment determines the operator who performs operations by line of sight from among users included in the captured image acquired by the process of (1) above (image acquisition process). Subsequently, in the process of (3) above (execution process), the information processing apparatus according to the present embodiment conducts a process on the basis of the line of sight of the operator determined in the process of (2) above (determination process).

Consequently, the information processing apparatus according to the present embodiment conducts the process of (1) above (image acquisition process), the process of (2) above (determination process), and the process of (3) above (execution process) as a process in accordance with an information processing method according to the present embodiment, and thereby may determine the operator who performs operations by line of site, and conduct a process on the basis of the line of sight of the determined operator.

[3] Applied Example of Process in Accordance with Information Processing Method According to Present Embodiment Next, an applied example of a process in accordance with the information processing method according to the present embodiment discussed above will be described.

Figure 3:
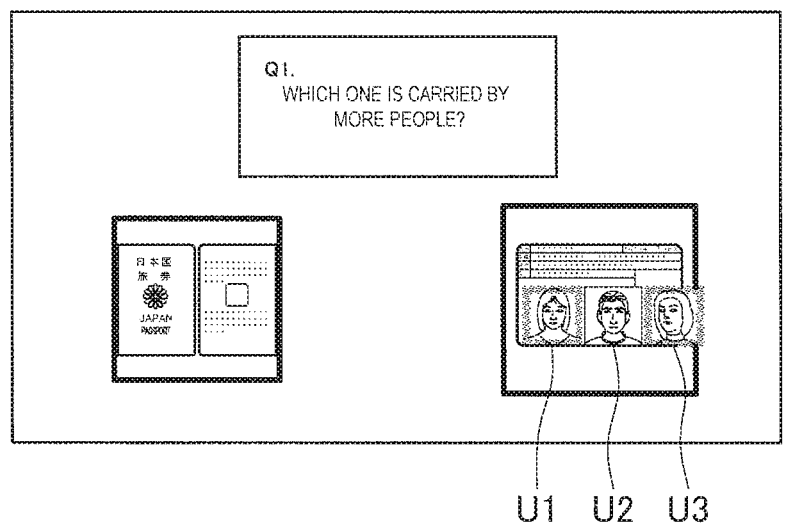
FIG. 3 is an explanatory diagram for describing an example of a process in accordance with an information processing method according to the present embodiment.

(I) First Applied Example of Process in Accordance with Information Processing Method According to Present Embodiment: Example of Application to Game FIG. 3 is an explanatory diagram for describing a first applied example of a process in accordance with an information processing method according to the present embodiment. FIG. 3 illustrates an example in which a process in accordance with an information processing method according to the present embodiment is applied to a game. U to U3 illustrated in FIG. 3 represent respective users determined to be the operator. In other words, the example of FIG. 3 illustrates users determined to be participants in a game.

In the case of determining a game participant, the information processing apparatus according to the present embodiment determines a participant (operator) by conducting one of the processes from the determination process according to the first example indicated in (2-1) above to the determination process according to the sixth example indicated in (2-6) above, for example.

In addition, when joining partway through or dropping out of the game, the information processing apparatus according to the present embodiment conducts a process as indicated in (a) and (b) below, for example.

(a) Case in which Information Processing Apparatus According to the Present Embodiment is Able to Conduct Face Recognition (a-1) Case in which Information Processing Apparatus According to the Present Embodiment is Unable to Use Detection Result of User's Head When there is a participating user whose face is no longer recognized partway through the game (such as when the relevant user is facing to the side or behind, for example), the information processing apparatus according to the present embodiment determines the participants in the game according to a mode configured from among the modes indicated below.

Other users are added as participants until the number of people from when the game was started is satisfied Users other than those who had been determined to be participants are not newly determined to be participants (in other words, users other than those who had been determined to be participants are not made to newly participate in the game)

(a-2) Case in which Information Processing Apparatus According to the Present Embodiment is Able to Use Detection Result of User's Head When there exists a participating user whose face is no longer detected partway through the game, and the head of the relevant user is detected (the case in which the relevant user is present within the angle of view of the imaging device or the like), the information processing apparatus according to the present embodiment maintains that user's status as a participant. In addition, when there exists a participating user whose face is no longer detected partway through the game, and the head of the relevant user is not detected, the information processing apparatus according to the present embodiment drops the relevant participating user from the game. For example in the example of FIG. 3, a participating user is dropped from the game by deleting the object indicating the user (one of the objects labeled U1 to U3) being displayed on the display screen.

(b) Case in which Information Processing Apparatus According to the Present Embodiment is Unable to Conduct Face Recognition (b-1) Case in which Information Processing Apparatus According to the Present Embodiment is Unable to Use Detection Result of User's Head During the game, the information processing apparatus according to the present embodiment determines the participants to be n people (where n is a set integer equal to or greater than 1) in order of one's face being detected, for example.

When there is a participating user whose face is no longer detected (such as when the relevant user is facing to the side or behind, for example), the information processing apparatus according to the present embodiment determines that the next candidate user is a participant in the game, for example. Also, when the face is detected again, if the number of users whose face is currently detected (number of participants) does not satisfy n people, the information processing apparatus according to the present embodiment determines that the re-detected user is a participant. Also, when the face is detected again, if the number of users whose face is currently detected (number of participants) satisfies n people, the information processing apparatus according to the present embodiment does not determine that the re-detected user is a participant.

Note that information processing apparatus according to the present embodiment may also determine a participant (operator) by conducting the determination process according to the first example indicated in (2-1) above or the determination process according to the second example indicated in (2-2) above, for example.

(b-2) Case in which Information Processing Apparatus According to the Present Embodiment is Able to Use Detection Result of User's Head The information processing apparatus according to the present embodiment conducts a process similar to (a-1) above, for example.

Figure 4:
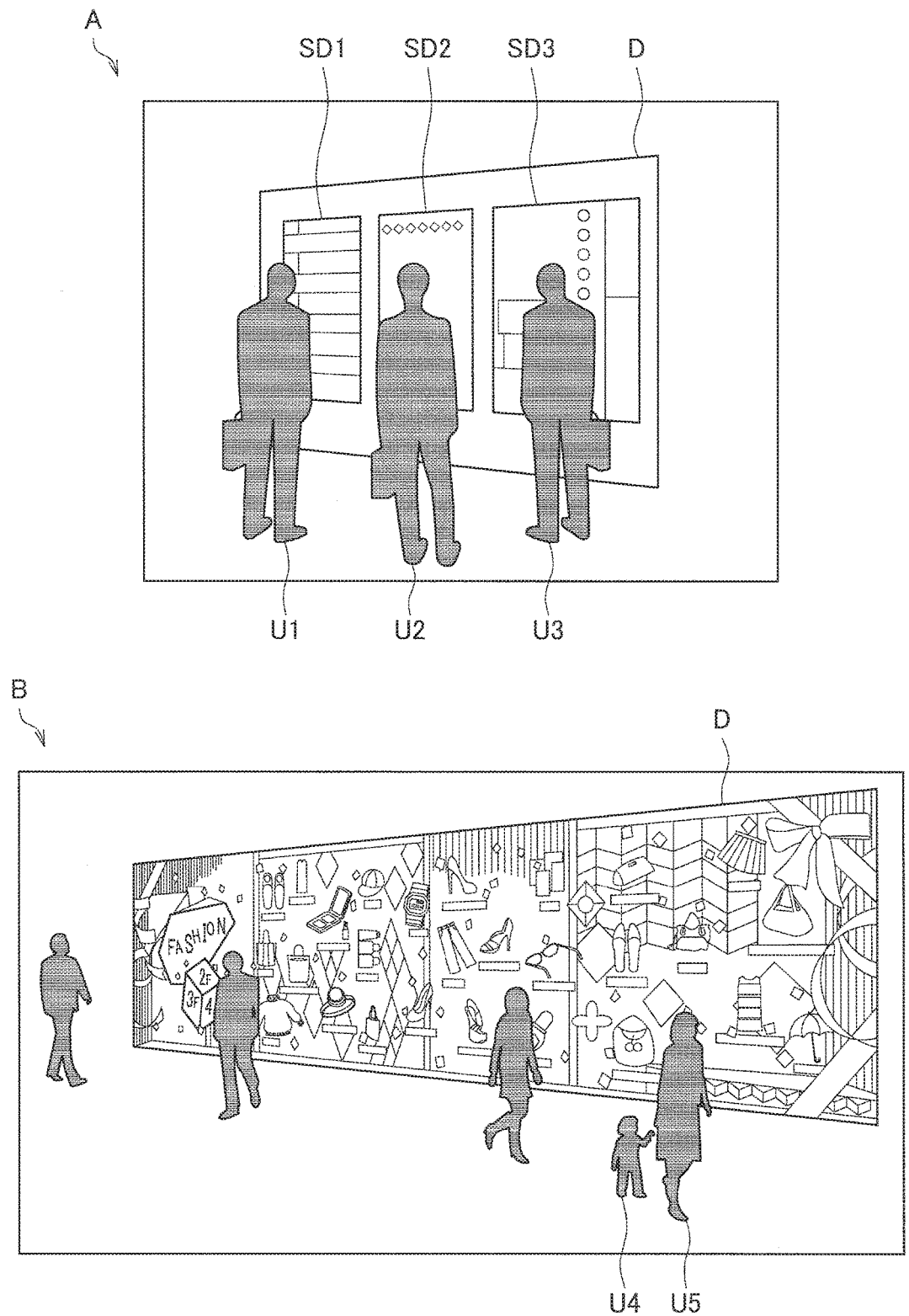
FIG. 4 is an explanatory diagram for describing a second applied example of a process in accordance with an information processing method according to the present embodiment.

(II) Second Applied Example of Process in Accordance with Information Processing Method According to Present Embodiment: Example of Application to the Operation of Digital Signage FIG. 4 is an explanatory diagram for describing a second applied example of a process in accordance with an information processing method according to the present embodiment. FIG. 4 illustrates an example in which a process in accordance with an information processing method according to the present embodiment is applied to the operation of digital signage. U1 to U5 illustrated in FIG. 4 indicate respective users who may be determined to be the operator.

A of FIG. 4 illustrates an example of a case in which a display screen D related to digital signage has three sub-screens SD1 to SD3, and the information processing apparatus according to the present embodiment determines the operator for each sub-screen SD1 to SD3 to be the closest person (user) to the sub-screens SD1 to SD3. An example of operation in the case illustrated in A of FIG. 4 may be an example of operating an information board at a department store as indicated below, for example.

Each of the users U1 to U3 determined to be the operator indicates by line of sight an object to be operated, and performs an operation such as a confirmation operation with a gesture or the like, such as by pointing a finger.

When one user is performing operations on a certain sub-screen, the information processing apparatus according to the present embodiment does not conduct a process corresponding to an operation on the relevant sub-screen by another user, and the other user is unable to perform an interrupt operation.

B of FIG. 4 illustrates an example of a case in which a display screen D related to digital signage is a single screen, and the information processing apparatus according to the present embodiment is able to determine multiple people (users) as the operator. An example of operation in the case illustrated in A of FIG. 4 may be an example given below, for example. An example of operation in the case illustrated in B of FIG. 4 may be an example of operating an advertising display inside a train station or the like as indicated below, for example.

If a child (user U4) looks at a desired object being displayed on the display screen D while saying "I want that", the information processing apparatus according to the present embodiment determines the operator to be the child (user U4), and enlarges the display of the object the child (user U4) is looking at, for example. By enlarging the display of the object the child (user U4) is looking at, it becomes possible to make the relevant object enter the visual field of a parent (user U5) accompanying the child (user U4).

If the parent (user U5) asks "How much is it?" while looking at the object, the information processing apparatus according to the present embodiment determines the operator to be the parent (user U5), and displays the price of the relevant object, for example.

Figure 5:
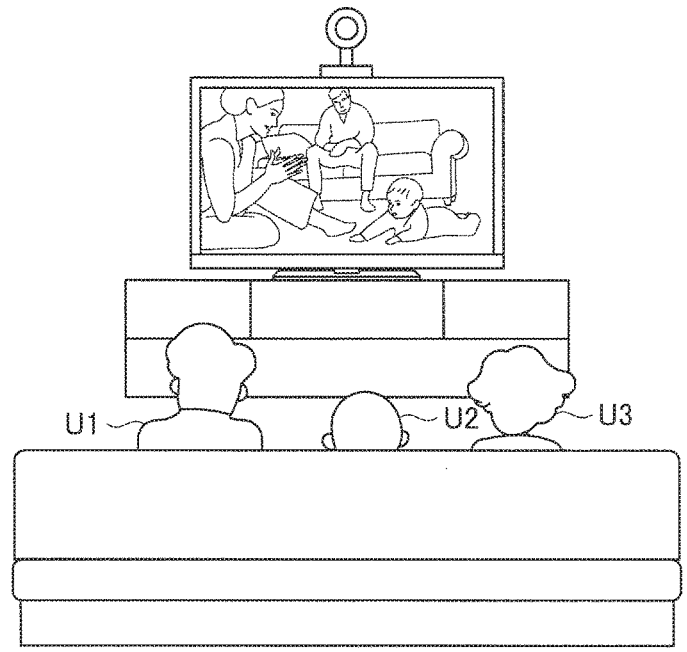
FIG. 5 is an explanatory diagram for describing a third applied example of a process in accordance with an information processing method according to the present embodiment.

(III) Third Applied Example of Process in Accordance with Information Processing Method According to Present Embodiment: Example of Application to the Operation of a Television Set FIG. 5 is an explanatory diagram for describing a third applied example of a process in accordance with an information processing method according to the present embodiment. FIG. 5 illustrates an example in which a process in accordance with an information processing method according to the present embodiment is applied to the operation of a television set. U1 to U3 illustrated in FIG. 5 indicate respective users who may be determined to be the operator.

When a process in accordance with an information processing method according to the present embodiment is applied to the operation of a television set, the users U1 to U3 are able to use line of sight to perform operations as indicated below, for example.

Operations for viewing photographs (still images) and moving images

Channel operations

Operations for displaying a program guide

An applied example of a process in accordance with an information processing method according to the present embodiment may be the first example indicated in (I) above to the third example indicated in (III) above, for example. Obviously, however, an applied example of a process in accordance with an information processing method according to the present embodiment is not limited to the first example indicated in (I) above to the third example indicated in (III) above.

(Information Processing Apparatus According to the Present Embodiment)

Next, an example of the configuration of an information processing apparatus according to the present embodiment capable of performing the processing according to the information processing method according to the present embodiment described above will be described.

Figure 6:
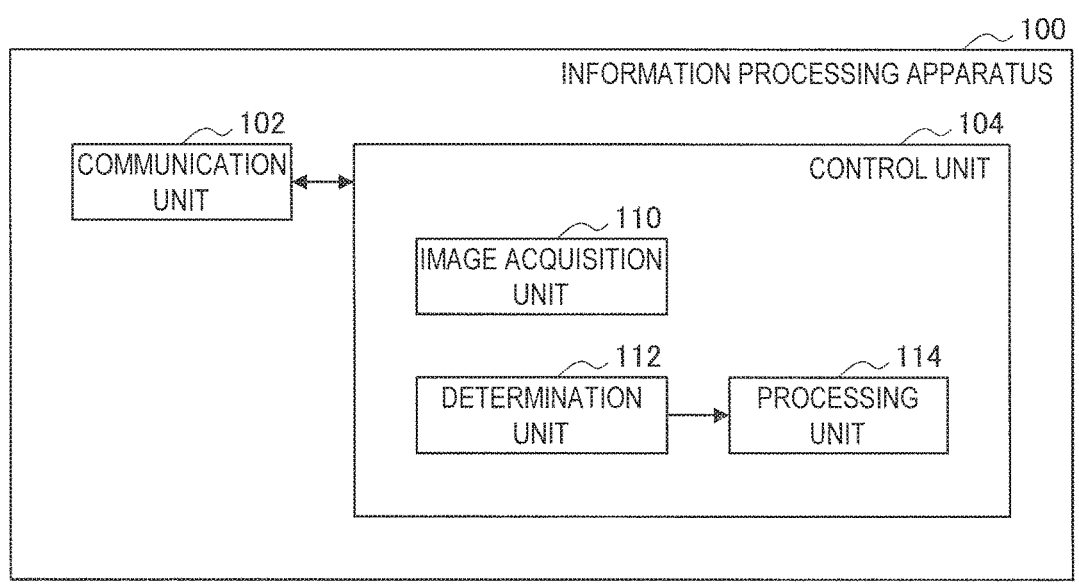
FIG. 6 is a block diagram illustrating an example of a configuration of an information processing apparatus according to the present embodiment.

FIG. 6 is a block diagram showing an example of the configuration of an information processing apparatus 100 according to the present embodiment. The information processing apparatus 100 includes, for example, a communication unit 102 and a control unit 104.

The information processing apparatus 100 may also include, for example, a ROM (Read Only Memory, not shown), a RAM (Random Access Memory, not shown), a storage unit (not shown), an operation unit (not shown) that can be operated by the user, and a display unit (not shown) that displays various screens on the display screen. The information processing apparatus 100 connects each of the above elements by, for example, a bus as a transmission path.

The ROM (not shown) stores programs used by the control unit 104 and control data such as operation parameters. The RAM (not shown) temporarily stores programs executed by the control unit 104 and the like.

The storage unit (not shown) is a storage means provided in the information processing apparatus 100, and stores various data, such as data in accordance with an information processing method according to the present embodiment such as a table (or a database) associating a user ID uniquely indicating a user with face information, and applications or the like. Herein, the storage unit (not shown) may be, for example, a magnetic recording medium such as a hard disk, or non-volatile memory such as flash memory. Additionally, the storage unit (not shown) may also be removable from the information processing apparatus 100.

As the operation unit (not shown), an operation input device described later can be cited. As the display unit (not shown), a display device described later can be cited.

(Hardware Configuration Example of the Information Processing Apparatus 100)

Figure 7:
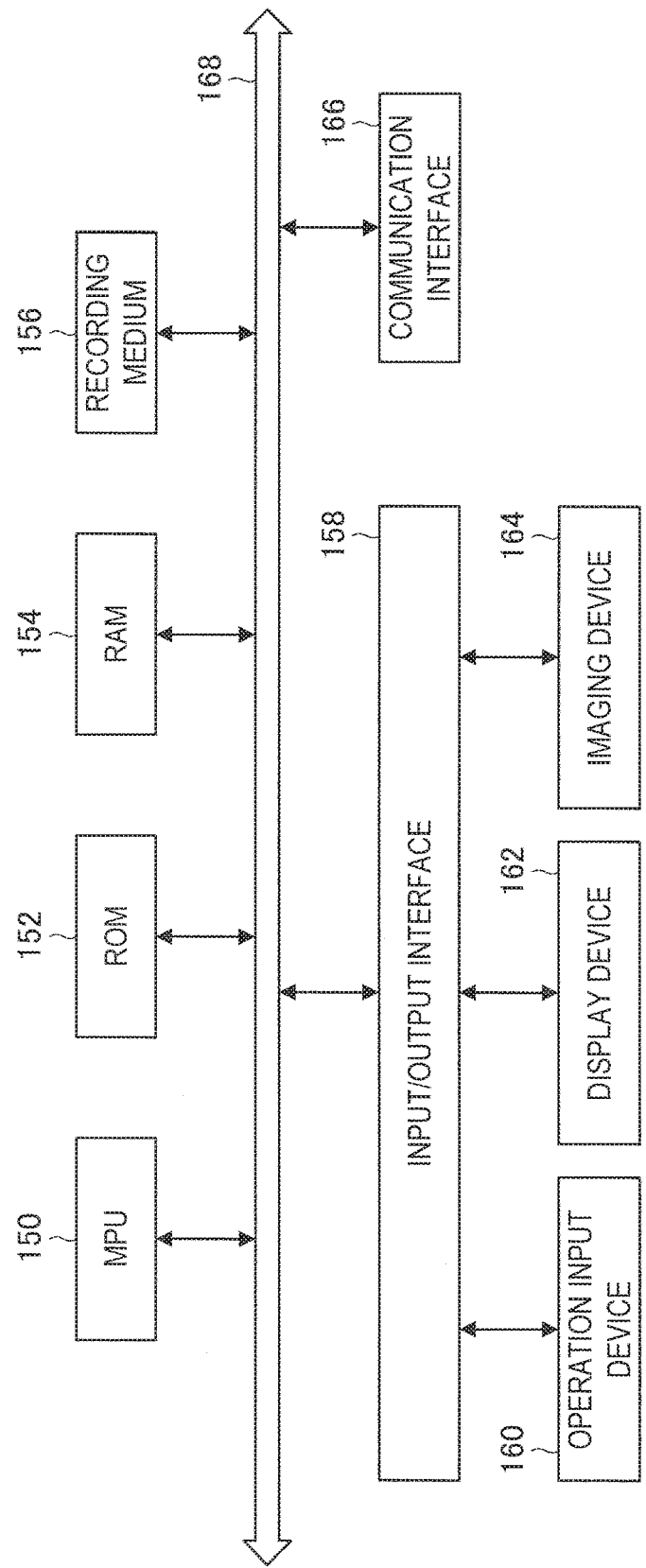
FIG. 7 is an explanatory diagram illustrating an example of a hardware configuration of an information processing apparatus according to the present embodiment.

FIG. 7 is an explanatory view showing an example of the hardware configuration of the information processing apparatus 100 according to the present embodiment. The information processing apparatus 100 includes, for example, an MPU 150, a ROM 152, a RAM 154, a recording medium 156, an input/output interface 158, an operation input device 160, a display device 162, an imaging device 164 and a communication interface 166. The information processing apparatus 100 connects each structural element by, for example, a bus 168 as a transmission path of data.

The MPU 150 is constituted of a processor configured by various operation circuits, such as a micro processing unit (MPU), or various processing circuits and functions as the control unit 104 that controls the whole information processing apparatus 100. The MPU 150 also plays the role of, for example, the image acquisition unit 110, the determination unit 112, and the processing unit 114 described later in the information processing apparatus 100.

The ROM 152 stores programs used by the MPU 150 and control data such as operation parameters. The RAM 154 temporarily stores programs executed by the MPU 150 and the like.

The recording medium 156 functions as a storage unit (not shown), and stores various data, such as data in accordance with an information processing method according to the present embodiment such as a table (or a database) associating a user ID uniquely indicating a user with face information, and applications or the like. As the recording medium 156, for example, a magnetic recording medium such as a hard disk and a nonvolatile memory such as a flash memory can be cited. The recording medium 156 may be removable from the information processing apparatus 100.

The input/output interface 158 connects, for example, the operation input device 160, the display device 162, and an imaging device 164. The operation input device 160 functions as an operation unit (not shown) and the display device 162 functions as a display unit (not shown). The imaging device 164 functions as a imaging unit (not shown). As the input/output interface 158, for example, a USB (Universal Serial Bus) terminal, a DVI (Digital Visual Interface) terminal, an HDMI (High-Definition Multimedia Interface) (registered trademark) terminal, and various processing circuits can be cited.

The operation input device 160 is, for example, included in the information processing apparatus 100 and connected to the input/output interface 158 inside the information processing apparatus 100. As the operation input device 160, for example, a button, a direction key, a rotary selector such as a jog dial, and a combination of these devices can be cited.

The display device 162 is, for example, included in the information processing apparatus 100 and connected to the input/output interface 158 inside the information processing apparatus 100. As the display device 162, for example, a liquid crystal display and an organic electro-luminescence display (also called an OLED display (Organic Light Emitting Diode Display)) can be cited.

The imaging device 164 is provided on the information processing apparatus 100 and is connected to the input/output interface 158 inside the information processing apparatus 100, for example. When the imaging device is provided, in the information processing apparatus 100, it becomes possible to process a captured image generated by imaging in the imaging device, determine the operator, obtain information about user line of sight on the basis of the captured image, and the like. Also, when the image device is provided, the information processing apparatus 100 is also capable of causing the display screen to display a captured image (or part of a captured image) generated by imaging in the imaging device, as indicated by U1 to U3 illustrated in FIG. 3, for example.

As the imaging device according to the present embodiment, for example, a lens/image sensor and a signal processing circuit can be cited. The lens/image sensor is constituted of, for example, an optical lens and an image sensor using a plurality of image sensors such as CMOS (Complementary Metal Oxide Semiconductor). The signal processing circuit includes, for example, an AGC (Automatic Gain Control) circuit or an ADC (Analog to Digital Converter) to convert an analog signal generated by the image sensor into a digital signal (image data). The signal processing circuit may also perform various kinds of signal processing, for example, the white balance correction processing, tone correction processing, gamma correction processing, YCbCr conversion processing, and edge enhancement processing.

It is needless to say that the input/output interface 158 can also be connected to an external device such as an operation input device (for example, a keyboard and a mouse), a display device, an imaging device as an external apparatus of the information processing apparatus 100. The display device 162 may be a device capable of both the display and user operations like, for example, a touch screen.

The communication interface 166 is a communication means included in the information processing apparatus 100 and functions as the communication unit 102 to communicate with an external device or an external apparatus such as an external imaging device, an external display device, and an external sensor via a network (or directly) wirelessly or through a wire. As the communication interface 164, for example, a communication antenna and RF (Radio Frequency) circuit (wireless communication), an IEEE802.15.1 port and transmitting/receiving circuit (wireless communication), an IEEE802.11 port and transmitting/receiving circuit (wireless communication), and a LAN (Local Area Network) terminal and transmitting/receiving circuit (wire communication) can be cited. As the network according to the present embodiment, for example, a wire network such as LAN and WAN (Wide Area Network), a wireless network such as wireless LAN (WLAN: Wireless Local Area Network) and wireless WAN (WWAN: Wireless Wide Area Network) via a base station, and the Internet using the communication protocol such as TCP/IP (Transmission Control Protocol/Internet Protocol) can be cited.

With the configuration shown in, for example, FIG. 7, the information processing apparatus 100 performs processing according to the information processing method according to the present embodiment. However, the hardware configuration of the information processing apparatus 100 according to the present embodiment is not limited to the configuration shown in FIG. 4.

For example, the information processing apparatus 100 additionally may be equipped with one or more sensors that fulfill the role of a detection unit (not illustrated) that obtains data which may be used in a process in accordance with an information processing method according to the present embodiment. The data which may be used in a process in accordance with an information processing method according to the present embodiment may be, for example, data which may be used to improve the estimation accuracy of the position of a user's line of sight, or data which may be used to specify (or estimate) the distance of a user from the display screen.

A sensor according to the present embodiment may be an arbitrary sensor capable of obtaining data which may be used in a process in accordance with an information processing method according to the present embodiment, such as an infrared sensor or a depth sensor, for example.

When configured to, for example, perform processing on a standalone basis, the information processing apparatus 100 may not include the communication interface 164. The information processing apparatus 100 may also be configured not to include the recording medium 156, the operation device 160, or the display device 162.

Referring to FIG. 6, an example of the configuration of the information processing apparatus 100 will be described. The communication unit 102 is a communication means included in the information processing apparatus 100 and communicates with an external device or an external apparatus such as an external imaging device, an external display device, and an external sensor via a network (or directly) wirelessly or through a wire. Communication of the communication unit 102 is controlled by, for example, the control unit 104.

As the communication unit 102, for example, a communication antenna and RF circuit and a LAN terminal and transmitting/receiving circuit can be cited, but the configuration of the communication unit 102 is not limited to the above example. For example, the communication unit 102 may adopt a configuration conforming to any standard capable of communication such as a USB terminal and transmitting/receiving circuit or any configuration capable of communicating with an external apparatus via a network.

The control unit 104 is made up of an MPU or the like, for example, and fulfills the role of controlling the information processing apparatus 100 overall. In addition, the control unit is equipped with the image acquisition unit 110, the determination unit 112, and the processing unit 114, and fulfills the leading role of conducting a process in accordance with an information processing method according to the present embodiment, for example.

The image acquisition unit 110 fulfills the leading role of conducting the process of (1) above (image acquisition process), and acquires a captured image according to the present embodiment.

The determination unit 112 fulfills the leading role of conducting the process of (2) above (determination process).

The determination unit 112 determines the operator from among users included in the captured image acquired by the image acquisition unit 110, for example. More specifically, the determination unit 112 determines the operator from among users included in the captured image on the basis of the captured image by conducting one of the processes from the determination process according to the first example indicated in (2-1) above to the determination process according to the sixth example indicated in (2-6) above, for example.

In addition, the determination unit 112 may also conduct one or more processes from among the determination process according to the seventh example indicated in (2-7) above to the determination process according to the tenth example indicated in (2-10) above.

The processing unit 114 fulfills the leading role of conducting the process of (3) above (execution process), and conducts a process on the basis of information about user line of sight corresponding to the operator determined in the determination unit 112.

In addition, the processing unit 114 may also conduct the execution process according to the first example indicated in (3-1) above, or the execution process according to the second example indicated in (3-2) above.

By being equipped with the image acquisition unit 110, the determination unit 112, and the processing unit 114, the control unit 104 leads the conducting of process in accordance with an information processing method according to the present embodiment, for example.

According to the configuration illustrated in FIG. 6, for example, the information processing apparatus 100 conducts a process in accordance with an information processing method according to the present embodiment (for example, the process of (1) above (image acquisition process), the process of (2) above (determination process), and the process of (3) above (execution process)).

Consequently, according to the configuration illustrated in FIG. 6, for example, the information processing apparatus 100 is able to determine an operator who performs operations by line of sight, and conduct a process based on the line of sight of the determined operator.

Also with the configuration shown in, for example, FIG. 6, the information processing apparatus 100 can achieve effects that can be achieved by, for example, the above processing according to the information processing method according to the present embodiment being performed.

However, the configuration of the information processing apparatus according to the present embodiment is not limited to the configuration in FIG. 6.

For example, the information processing apparatus according to the present embodiment can include one or two or more of the image acquisition unit 110, the determination unit 112, and the processing unit 114 shown in FIG. 6 separately from the control unit 104 (for example, realized by a separate processing circuit).

The information processing apparatus according to the present embodiment may not include the communication unit 102 when communicating with an external device or an external apparatus via an external communication device having the function and configuration similar to those of the communication unit 102 or when configured to perform processing on a standalone basis.

Also, the information processing apparatus according to the present embodiment additionally may be equipped with an imaging unit (not shown) made up of an imaging device, for example. When the imaging unit (not shown) is provided, in the information processing apparatus according to the present embodiment, it becomes possible to process a captured image generated by imaging in the imaging unit (not shown), determine the operator, obtain information about user line of sight on the basis of the captured image, and the like. Also, when the image unit (not shown) is provided, the information processing apparatus according to the present embodiment is also capable of causing the display screen to display a captured image (or part of a captured image) generated in the imaging unit (not shown), as indicated by U1 to U3 illustrated in FIG. 3, for example.

Also, the information processing apparatus according to the present embodiment additionally may be equipped with a detection unit (not shown) made up of an arbitrary sensor capable of obtaining data which may be used in a process in accordance with an information processing method according to the present embodiment, for example. When the detection unit (not shown) is provided, the information processing apparatus according to the present embodiment uses detection values from the detection unit (not shown) in a process in accordance with an information processing method according to the present embodiment, for example.

In the foregoing, the information processing apparatus has been described as the present embodiment, but the present embodiment is not limited to such a form. The present embodiment can also be applied to various devices, for example, a TV set, a display apparatus, a tablet apparatus, a communication apparatus such as a mobile phone and smartphone, a video/music playback apparatus (or a video/music recording and playback apparatus), a game machine, and a computer such as a PC (Personal Computer). The present embodiment can also be applied to, for example, a processing IC (Integrated Circuit) that can be embedded in devices as described above.

The present embodiment may also be realized by a system including a plurality of apparatuses predicated on connection to a network (or communication between each apparatus) like, for example, cloud computing. That is, the above information processing apparatus according to the present embodiment can be realized as, for example, an information processing system including a plurality of apparatuses.

(Program According to Present Embodiment)

A program for causing a computer to function as an information processing apparatus according to the present embodiment (for example, a program enabling the execution of a process in accordance with an information processing method according to the present embodiment, such as the process of (1) above (image acquisition process), the process of (2) above (determination process), and the process of (3) above (execution process)) may be executed by a processor or the like in the computer, and thereby enable the computer to determine an operator who performs operations by line of sight, and conduct a process on the basis of the line of sight of the determined operator.

Also, effects achieved by the above processing according to the information processing method according to the present embodiment can be achieved by a program causing a computer to function as an information processing apparatus according to the present embodiment being performed by a processor or the like in the computer.

In the foregoing, the preferred embodiment of the present disclosure has been described in detail with reference to the accompanying drawings, but the technical scope of the present disclosure is not limited to the above examples. A person skilled in the art may find various alterations and modifications within the scope of the appended claims and it should be understood that they will naturally come under the technical scope of the present disclosure.

For example, the above shows that a program (computer program) causing a computer to function as an information processing apparatus according to the present embodiment is provided, but the present embodiment can further provide a recording medium caused to store the program.

The above configuration shows an example of the present embodiment and naturally comes under the technical scope of the present disclosure.

Effects described in this specification are only descriptive or illustrative and are not restrictive. That is, the technology according to the present disclosure can achieve other effects obvious to a person skilled in the art from the description of this specification, together with the above effects or instead of the above effects.

Additionally, the present technology may also be configured as below.

(1)

An information processing apparatus including:

an image acquisition unit configured to acquire a captured image of users;

a determination unit configured to determine an operator from among the users included in the acquired captured image; and a processing unit configured to conduct a process based on information about user line of sight corresponding to the determined operator.

(2)

The information processing apparatus according to (1), wherein the determination unit determines the operator based on a size of a face region including a face portion of a user detected from the captured image.

(3)

The information processing apparatus according to (2), wherein the determination unit determines the operator to be a single user corresponding to the face region having the largest face region size.

(4)

The information processing apparatus according to (3), wherein in a case in which a plurality of the face regions having the largest face region size exists, the determination unit determines the operator to be a user corresponding to the face region detected earlier.

(5)

The information processing apparatus according to (3) or (4), wherein when a first difference value, which indicates a difference of the size of the face region corresponding to a user determined to be the operator from the size of the face region corresponding to another user who is a user not determined to be the operator from among the users included in the captured image, is equal to or greater than a configured first threshold value, or when the first difference value is greater than the first threshold value, the determination unit determines that the user who had been determined to be the operator is not the operator.

(6)

The information processing apparatus according to (2), wherein the determination unit determines the operator to be users up to a configured number of people in order of largest face region size.

(7)

The information processing apparatus according to (1), wherein the determination unit determines the operator based on a distance from a display screen of a user corresponding to a face region including a face portion of a user detected from the captured image.

(8)

The information processing apparatus according to (7), wherein the determination unit determines the operator to be a single user corresponding to the face region having the shortest distance corresponding to the face region.

(9)

The information processing apparatus according to (8), wherein in a case in which a plurality of distances corresponding to the face region having the shortest distance corresponding to the face region exists, the determination unit determines the operator to be a user corresponding to the face region detected earlier.

(10)

The information processing apparatus according to (8) or (9), wherein when a second difference value, which indicates a difference of a distance corresponding to the face region corresponding to another user who is a user not determined to be the operator from among the users included in the captured image from a distance corresponding to the face region corresponding to a user determined to be the operator, is equal to or greater than a configured second threshold value, or when the second difference value is greater than the second threshold value, the determination unit determines that the user who had been determined to be the operator is not the operator.

(11)

The information processing apparatus according to (7), wherein the determination unit determines the operator to be users up to a configured number of people in order of shortest distance corresponding to the face region.

(12)

The information processing apparatus according to (1), wherein the determination unit determines the operator based on a predetermined gesture detected from the captured image.

(13)

The information processing apparatus according to (1), wherein when a position of line of sight of a user on a display screen indicated by the information about user line of sight based on the captured image is included in a configured region on the display screen, the determination unit determines the operator to be the user corresponding to the line of sight.

(14)

The information processing apparatus according to (1), wherein the determination unit identifies a user included in the captured image based on the captured image, and determines the operator based on a ranking associated with the identified user.

(15)

The information processing apparatus according to any one of (1) to (14), wherein the determination unit configures an operation level for a user determined to be the operator, and the processing unit dynamically changes available processes based on the operation level configured for the user determined to be the operator.

(16)

The information processing apparatus according to any one of (1) to (15), wherein when predetermined speech spoken by another user who is a user not determined to be the operator from among the users included in the captured image is recognized as a result obtained by conducting speech recognition on an acquired speech signal, the processing unit conducts a process based on information about user line of sight corresponding to the other user.

(17)

The information processing apparatus according to any one of (1) to (16), wherein when it is not possible to acquire the information about user line of sight corresponding to a user determined to be the operator from the captured image, the determination unit determines that the user who had been determined to be the operator is not the operator.

(18)

The information processing apparatus according to (17), wherein when it is not possible to acquire the information about user line of sight corresponding to a user determined to be the operator from the captured image, but a head of the user determined to be the operator is detected from the captured image, the determination unit does not determine that the user who had been determined to be the operator is not the operator.

(19)

The information processing apparatus according to any one of (1) to (18), wherein when a predetermined combination of gestures by a user determined to be the operator and another user who is a user not determined to be the operator from among the users included in the captured image is detected, the determination unit changes the operator from the user who had been determined to be the operator to the other user.

(20)

An information processing method executed by an information processing apparatus, the information processing method including:

a step of acquiring a captured image of users;

a step of determining an operator from among the users included in the acquired captured image; and a step of conducting a process based on information about user line of sight corresponding to the determined operator.

REFERENCE SIGNS LIST

100 information processing apparatus
102 communication unit
104 control unit
110 image acquisition unit
112 determination unit
114 processing unit

The invention claimed is:

1. An information processing apparatus, comprising:
a display screen; and
one or more processors configured to:
acquire a captured image that includes a plurality of users;
detect a plurality of face regions that correspond to the plurality of users in the captured image;
determine an operator from the plurality of users included in the captured image, based on a position of a line of sight of a first user of the plurality of users in a specific region on the display screen and based on a size of each of the plurality of face regions; and
control a first process based on first information associated with the line of sight corresponding to the determined operator.

2. The information processing apparatus according to claim 1, wherein the one or more processors are further configured to determine the first user of the plurality of users as the operator based on a first face region of the plurality of face regions, wherein the first face region corresponds to the first user that has a largest face region size among the plurality of face regions.

3. The information processing apparatus according to claim 2, wherein based on each of a set of face regions of the plurality of face regions, that have a face region size that is largest among the plurality of face regions, the one or more processors are further configured to determine the first face region of the set of face regions as the operator, wherein the first face region is detected prior to a second face region of the set of face regions.

4. The information processing apparatus according to claim 3, wherein the one or more processors are further configured to determine a configured number of users of the plurality of users as the operator, based on the set of face regions that have the face region size that is largest among the plurality of face regions.

5. The information processing apparatus according to claim 2, wherein
the one or more processors are further configured to determine the first user is a user other than the operator based on a first difference value that is equal to or greater than a first threshold value,
the first difference value indicates a difference of a first face region size corresponding to the first user and a second face region size corresponding to a second user other than the first user.

6. The information processing apparatus according to claim 1, wherein the one or more processors are further configured to determine the operator based on a corresponding distance of each face region of the plurality of face regions from the display screen.

7. The information processing apparatus according to claim 6, wherein the one or more processors are further configured to determine the first user of the plurality of users as the operator based on a first face region of the first user that has a shortest distance among the corresponding distance of the each face region of the plurality of face regions from the display screen.

8. The information processing apparatus according to claim 7, wherein based on each of a set of distances having the shortest distance among the corresponding distance of the each face region of the plurality of face regions, the one or more processors are further configured to determine the first user as the operator, wherein the first user that corresponds to the set of distances is detected prior to a second user that corresponds to the set of distances.

9. The information processing apparatus according to claim 8, wherein the one or more processors are further configured to determine a configured number of users of the plurality of users as the operator, based on the set of distances that have the shortest distance.

10. The information processing apparatus according to claim 7, wherein
the one or more processors are further configured to determine the first user is a user other than the operator based on a second difference value that is equal to or greater than a second threshold value,
the second difference value indicates a difference between a first distance from the display screen and a second distance from the display screen, wherein the first distance corresponds to the first face region of the first user and the second distance corresponds to a second face region of a second user of the plurality of users.

11. The information processing apparatus according to claim 1, wherein the one or more processors are further configured to determine the operator based on a specific gesture detected from the captured image.

12. The information processing apparatus according to claim 1, wherein the one or more processors are further configured to determine the operator based on a rank associated with each of the plurality of users.

13. The information processing apparatus according to claim 1, wherein the one or more processors are further configured to:
determine an operation level for the first user of the plurality of users, wherein the first user is determined as the operator; and
dynamically change available processes based on the determined operation level.

14. The information processing apparatus according to claim 1, wherein based on a determination that a known speech is spoken by a second user of the plurality of users, the one or more processors are further configured to control a second process based on second information about a line of sight corresponding to the second user.

15. The information processing apparatus according to claim 1, wherein based on an unavailability of the first information, the one or more processors are further configured to determine a new operator from among the plurality of users.

16. The information processing apparatus according to claim 1, wherein based on an unavailability of the first information, the one or more processors are further configured to determine the operator based on a detection of a head among the plurality of users.

17. The information processing apparatus according to claim 1, wherein based on a detection of a known combination of gestures by the first user determined as the operator and a second user other than the first user, the one or more processors are further configured to change the operator from the first user to the second user.

18. The information processing apparatus according to claim 1, wherein the one or more processors are further configured to determine the first user of the plurality of users as the operator based on the position of the line of sight of the first user that is included in the specific region on the display screen, and wherein the first information associated with the line of sight of the first user indicates that the position of the line of sight of the first user is included in the specific region on the display screen.

19. An information processing method, comprising:
in an information processing apparatus:
acquiring a captured image that includes a plurality of users;
detecting a plurality of face regions that correspond to the plurality of users in the captured image;
determining an operator from the plurality of users included in the captured image, based on a position of a line of sight of a user of the plurality of users in a specific region on a display screen and based on a size of the plurality of face regions of the plurality of users; and
controlling a process based on information associated with the line of sight corresponding to the determined operator.

* * * * *